United States Patent
Lee et al.

(10) Patent No.: US 8,631,919 B2
(45) Date of Patent: Jan. 21, 2014

(54) AUTOMATIC TRANSMISSION SHIFT QUALITY VIA SELECTIVE USE OF CLOSED-LOOP PRESSURE FEEDBACK CONTROL

(75) Inventors: Chunhao J. Lee, Troy, MI (US); Paul G. Otanez, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 419 days.

(21) Appl. No.: 12/971,044

(22) Filed: Dec. 17, 2010

(65) Prior Publication Data

US 2012/0152688 A1 Jun. 21, 2012

(51) Int. Cl.
*F16D 48/06* (2006.01)
*F16D 25/10* (2006.01)

(52) U.S. Cl.
USPC ............... 192/48.601; 192/85.63; 192/109 F

(58) Field of Classification Search
USPC .................................................... 192/48.601
See application file for complete search history.

(56) References Cited

U.S. PATENT DOCUMENTS

| | | | |
|---|---|---|---|
| 4,670,843 A * | 6/1987 | Matsumura et al. | 701/61 |
| 5,343,994 A * | 9/1994 | Kyrtsos | 192/85.63 |
| 5,908,098 A * | 6/1999 | Gorman et al. | 192/109 F |
| 2003/0192383 A1* | 10/2003 | Chen | 73/718 |
| 2007/0051580 A1* | 3/2007 | Gunderson et al. | 192/85 R |
| 2009/0209383 A1* | 8/2009 | Olson et al. | 475/120 |

* cited by examiner

*Primary Examiner* — Richard M. Lorence

(57) ABSTRACT

A method to control a hydraulically actuated clutch in a transmission of a vehicle includes monitoring a pressure in a hydraulic circuit providing pressurized fluid to the hydraulically actuated clutch with micro-electromechanical pressure sensor, providing a closed-loop feedback control command for a hydraulic control device providing the pressurized fluid to the hydraulic circuit based upon the monitoring pressure, and controlling the control device based upon the closed-loop feedback control command.

11 Claims, 4 Drawing Sheets

AUTOMATIC TRANSMISSION SHIFT QUALITY VIA SELECTIVE USE OF CLOSED-LOOP PRESSURE FEEDBACK CONTROL

TECHNICAL FIELD

This disclosure is related to a system and method for controlling an automatic transmission.

BACKGROUND

The statements in this section merely provide background information related to the present disclosure and may not constitute prior art.

A powertrain utilizing a rotational input torque through an input shaft to drive an output shaft is known to utilize a transmission to change gear states. Such a rotational input torque can come from a number of devices, individually or in cooperation, including an internal combustion engine, an electric machine, or other similar devices capable of providing the input torque. Such a powertrain can exist within a vehicle or in a non-vehicle application.

Operation of a powertrain requires management of numerous torque bearing shafts or connections among the above mentioned engine, electrical machines, input shaft, output shaft, and driveline. Shifting between gear states in an automatic transmission may require that at least one clutch be loaded or unloaded. In an exemplary clutch utilizing hydraulic pressure in combination with pistons selectively applying force based upon the hydraulic pressure, a shift in gear states or a gear shift requires that one clutch be unloaded, permitting two shafts that were previously coupled to spin freely of each other, and subsequently that another clutch be loaded, coupling two shafts that were formerly free to spin relative to one another. The coupling of the various shafts defines the resulting relationship between the input shaft and the output shaft. In one exemplary transmission, the various shafts control operation of a planetary gear set through which the necessary mechanical transformations of the transmission are made.

A control system must be able to accurately command the necessary transitions within the transmission to control desired gear shifts. Performing the transitions in a disorderly or non-sequential manner may cause undesirable performance, including adverse impacts to drivability or passenger perceptible changes to the operation of the vehicle.

Clutches are devices well known in the art for engaging and disengaging shafts including the management of rotational velocity and torque differences between the shafts. Clutches are known in a variety of designs and control methods. One known type of clutch is a mechanical clutch operating by separating or joining two connective surfaces (e.g. clutch plates) operating, when joined, to apply frictional torque to each other. One control method for operating such a mechanical clutch includes, as described above, applying a hydraulic control system implementing fluidic pressures transmitted through hydraulic lines to exert or release clamping force between the two connective surfaces. A gear shift frequently involves exhausting fluid from the piston of one clutch and filling fluid in another clutch. It will be appreciated that while orderly decoupling and coupling of the various shafts within the transmission is desired, it is also desired to accomplish the required transitions in as short a time period as possible. As a result, a filling of an on-coming clutch to be coupled can begin while an off-going clutch is still coupled, for example, with its process of exhausting the associated piston having just begun. Exemplary optimization of such a transition may include exhausting the off-going clutch to a point where normal forces between the associated clutch plates are reduced to zero just before normal forces between the associated plates of the on-coming clutch exceed zero.

SUMMARY

A method to control a hydraulically actuated clutch in a transmission of a vehicle includes monitoring a pressure in a hydraulic circuit providing pressurized fluid to the hydraulically actuated clutch with micro-electromechanical pressure sensor, providing a closed-loop feedback control command for a hydraulic control device providing the pressurized fluid to the hydraulic circuit based upon the monitoring pressure, and controlling the control device based upon the closed-loop feedback control command.

BRIEF DESCRIPTION OF THE DRAWINGS

One or more embodiments will now be described, by way of example, with reference to the accompanying drawings, in which.

DETAILED DESCRIPTION

Figure 1:
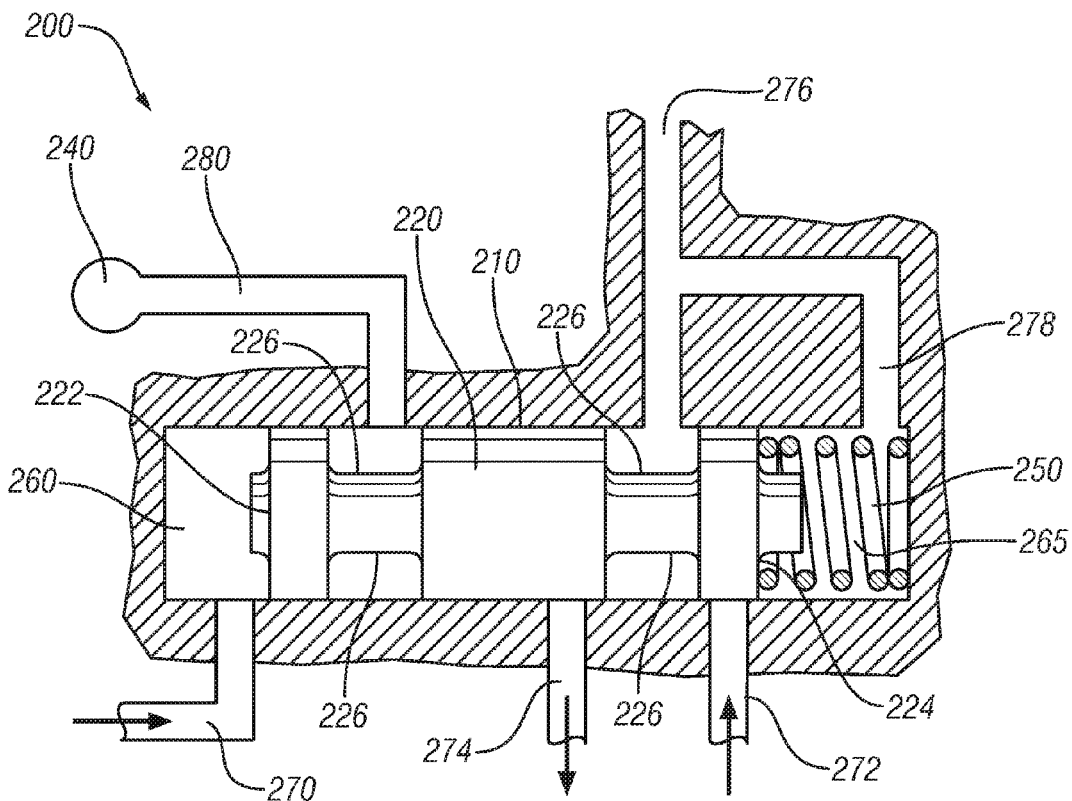
FIG. 1 schematically illustrates an exemplary clutch control system utilizing a regulation valve, in accordance with the present disclosure.

Referring now to the drawings, wherein the showings are for the purpose of illustrating certain exemplary embodiments only and not for the purpose of limiting the same, FIG. 1 schematically illustrates an exemplary clutch control system utilizing a regulation valve, in accordance with the present disclosure. Clutch control system 200 includes regulation valve 210, pressure switch 240, and hydraulic lines 270, 272, 274, 276, 278, and 280. Regulation valve 210 selectively controls flow of pressurized hydraulic oil to and from a hydraulically actuated clutch by translation of selecting mechanism within the regulation valve, in this exemplary embodiment, a spool valve plunger 220. Plunger 220 is selectively acted upon from a first end 222 of the plunger and a second end 224 of the plunger, the balance of forces determining the translative position of the plunger within the regulation valve. Plunger 220 includes plunger details 226 including holes, grooves, channels, or other features formed on the plunger in order to selectively direct hydraulic oil between various ports connecting hydraulic lines to regulation valve 210. The position of plunger 220 within regulation valve 210, corresponding to clutch states described above, selectively aligns plunger details 226 with hydraulic lines accomplishing the intended clutch function. In the exemplary system of FIG. 1, a plunger position to the far right corresponds to a full feed state, wherein hydraulic pressure from a main pressure line 272 is channeled through plunger details 226 to clutch feed line 276. Hydraulic pressure from a main pressure line 272 may be referred to as $P_{LINE}$. Similarly, a plunger position to the far left corresponds to an exhaust state, wherein hydraulic oil within the clutch is allowed to escape the clutch from clutch feed line 276, through plunger details 226 to flow through exhaust line 274, entering a hydraulic control system return line. Selecting the position of plunger 220 is accomplished by modulating a command pressure to a command pressure line 270 feeding a command pressure volume 260 in contact with first end 222 of plunger 220. Force created by pressure on a surface can be determined through the following equation.

$$\text{FORCE} = \text{PRESSURE} * \text{SURFACE\_AREA\_ACTED\_UPON} \quad [1]$$

In the case of exemplary plunger 220, the force acting upon the plunger from the left equals the hydraulic pressure achieved within command pressure volume 260 times the surface area of first end 222. An increase in pressure within command pressure volume 260 increases the force acting upon plunger 220 from the side of first end 222. A valve return spring 250 applies a force to the second end 224 of plunger 220, acting as a restorative force in the opposite direction of the pressure within command pressure volume 260. Force resulting from pressure within volume 260 and force from spring 250 act together such that increased pressure within command pressure volume 260 tends to move plunger 220 in one direction, and reduced pressure within command pressure volume 260 tends to move plunger 220 in the opposite direction. Exemplary regulation valve 210 includes another feature including a feedback line 278. Hydraulic oil flowing through clutch feed line 276 additionally flows or applies a pressure through feedback line 278. Hydraulic oil from feedback line 278 re-enters regulation valve 210 within a feedback pressure volume 265 located on the same side of plunger 220 as spring 250. Force resulting upon plunger 220 from hydraulic pressure within feedback pressure volume 265 counteracts force resulting from hydraulic pressure within command pressure volume 260. As a result, wherein a balance of forces resulting from pressure within command pressure volume 260 and spring 250 would cause plunger 220 to be in a position correlating to a full feed state, elevated pressure achieved within clutch feed line 276 associated with a clutch fill event reaching a certain progression creates a force acting upon plunger 220 away from the full feed state position. Calibration and/or control of feedback line 278 and resulting force upon plunger 220 corresponding to a selected pressure within command pressure volume 260 can create a self-correcting plunger position between the opposite ends of plunger travel, enabling an overlap state. Such an overlap state is useful for modulating the pressure achieved within the clutch, for example, enabling calibrated control to a touching state for the clutch. Full feed state can still be achieved despite operation of the feedback line 278 by setting pressure within the command pressure volume 260 to apply a force to plunger 220 exceeding the combination of the force applied by spring 250 and force resulting from hydraulic pressure within feedback pressure volume 265. Regulation valve 210 includes pressure switch 240, fed by pressure switch line 280, utilized in known control methods to indicate pressure levels required for control of regulation valve 210. In this way, regulation valve 210 can selectively channel hydraulic oil to accomplish multiple states within a hydraulically activated clutch.

By modulating a command pressure, a regulation valve of the above exemplary configuration can operate in three states. A high command pressure commands a full feed state, allowing full exposure of $P_{LINE}$ to the clutch being filled. A low or null command pressure commands an exhaust state, blocking access of $P_{LINE}$ to the clutch and providing a path to exhaust hydraulic pressure from within the clutch. An intermediate or calibrated command pressure commands an overlap state. The function of an overlap state depends upon the calibration of the calibrated command pressure. An exemplary function of such an overlap state is to command a touching state in the clutch, enabling gradual ramping up of pressure between the clutch plates. Selective calibration of the command pressure to achieve the overlap state, in combination with monitored operation of the pressure switch, allows for accurately selecting a fill level within the clutch, for example, a fill level corresponding to a touching state in the clutch.

A number of regulation valve physical configurations may be utilized to carry out the described functions. One exemplary regulation valve configuration, as described above, utilizes a cylindrical plunger located in a cylindrical housing. However, this disclosure is not intended to be limited to the particular exemplary embodiments described herein.

Pressure switch 240 is calibrated to indicate a pressure reaching some level. The pressure switch can be utilized, for example, to indicate a positive signal only when the regulation valve is in a full feed state. In such an exemplary use, the calibration of the pressure switch indication need not correspond to the actual pressures to which it is exposed, for example pressure levels in the command pressure volume 260, but can rather indicates some nominal level which the pressure always exceeds when the pressure switch is exposed to the pressurized hydraulic fluid.

Regulation valve 210 described above operates based upon a command pressure delivered through command pressure line 270. An exemplary device to provide the command pressure is a variable bleeding solenoid, which delivers a low flow command pressure to the regulation valve 210 as described above.

The above regulation valve 210 is one exemplary device to control hydraulic pressures within system. Other devices are known to operate equivalently to the exemplary regulation valve. For example, a variable force solenoid is known that operates similarly to the low flow variable bleeding solenoid, except that no regulation valve is required, and the variable force solenoid delivers a high flow at the desired pressure directly to the clutch. A number of clutch control system embodiments are known. The disclosure is not intended to be limited to the exemplary embodiment depicted in FIG. 1.

The above described regulation valve 210 utilizes pressure switch 240 to monitor a state of the regulation valve 210. Such a pressure switch provides a binary signal indicating whether a monitored pressure exceeds a predetermined threshold pressure to which the switch is calibrated or tuned. The methods described above to control clutch actuating devices can utilize this binary signal to estimate operation of the regulation valve 210 and resulting filling, purging, or operation of the clutch. However, it will be appreciated that such control is still an open-loop control event.

Figure 2:
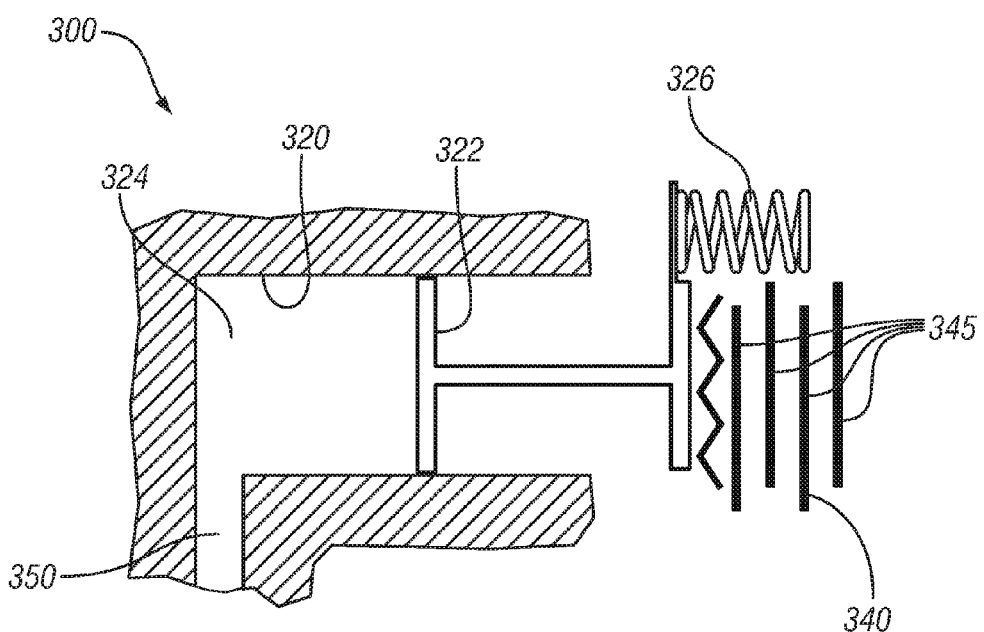
FIG. 2 schematically illustrates an exemplary hydraulically actuated clutch operated to provide clamping force upon a mechanical clutch, in accordance with the present disclosure.

FIG. 2 schematically illustrates an exemplary hydraulically actuated clutch operated to provide clamping force upon a mechanical clutch, in accordance with the present disclosure. Clutch assembly 300 comprises a clutch cylinder 320 and a mechanical clutch 340. Clutch cylinder 320 includes a piston 322 and a clutch volume chamber 324. Pressurized hydraulic fluid at some fill pressure enters clutch volume chamber 324 through hydraulic line 350. Hydraulic line 350 is fluidly connected with a mechanism for selectively applying hydraulic flow, such as exemplary regulation valve 210. Hydraulic oil in clutch volume chamber 324 exerts pressure upon piston 322. Piston 322 transforms the fill pressure exerted by the hydraulic fluid into a force. The force transmitted through piston 322 is used to articulate mechanical clutch 340 through various states required according to synchronous clutch operation described above. Positive hydraulic pressure is used to fill the clutch volume chamber 324 and move piston 322 in one direction. As will be appreciated by one having ordinary skill in the art, evacuation of hydraulic oil from clutch volume chamber 324 acts in some degree to move piston 322 in the other direction, but cavitation limits the ability of low pressure hydraulic fluid from effectively moving piston 322. As a result, return spring 326 is utilized to provide force to move piston 322 in the direction to exhaust the hydraulic oil from clutch volume chamber 324.

Mechanical clutch 340 is selectively actuated by the transmission of force through piston 322. Mechanical clutch 340 includes clutch connective surfaces in the form of clutch plates 345. Clutch plates 345 are connected to rotating members within the transmission. When mechanical clutch 340 is not actuated, clutch plates 345 are kept separate. Spinning of some fraction of clutch plates 345 does not cause spinning of the remaining fraction of clutch plates 345. When mechanical clutch 340 is actuated, clutch plates 345 are brought into contact with neighboring plates, and sufficient frictional forces between clutch plates 345 creates a locked relationship wherein the plates rotate in unison.

As described above, an exemplary transition within a hydraulically controlled clutch is controlled through a regulation valve. While a pressure switch is known to be utilized within a regulation valve, for example, indicating a position of the plunger in a fill, exhaust, or middle position, the condition of the piston attached to the clutch being filled by the regulation valve is essentially unknown by the control device or module controlling the regulation valve. Similarly, with a variable force solenoid described above, a calibrated solenoid setting can be used to deliver pressurized fluid to the clutch. But, while the calibrated setting of the solenoid and the period of activation of the solenoid are known, the resulting conditions including any variation from calibrated settings are unknown. By any of the described methods above, filling and exhausting hydraulic fluid into and out of the clutch volume chamber are open-loop controls, with calibrated timing and fill pressures being utilized to achieve a desired result in the clutch volume chamber and associated clutch. However, it will be appreciated that such open-loop control has inherent inaccuracies, with variances in the system leading to inaccuracies in the actuation of the piston. Such inaccuracies can lead to inefficient clutch operation, for example, requiring longer calibrated fill and exhaust times to account for variability in the system. Further, such inaccuracies can lead to flares (i.e. rapid increases in slip and/or engine speed), tie-ups (i.e. undesirable gear set combination), or other unintended operation in the transmission.

Closed-loop control of a hydraulically controlled clutch based upon feedback of conditions within the clutch volume chamber of the clutch can be used to reduce inaccuracies in the system, for example, permitting better estimation of locked or unlocked status in the clutch, and allow for faster fill and exhaust times and for better control of clutch pressures, for example, as used in a clutch in a slip mode. However, some known pressure sensors or pressure transducers are too large to be utilized effectively in a transmission case. Bulky pressure sensors can make feedback control of hydraulically controlled clutches unwieldy or unfeasible. In one exemplary embodiment, a micro-electromechanical systems (MEMS) technology pressure sensor is utilized wholly or substantially within a wall defining a hydraulic circuit or a hydraulic line, for example within the valve body housing or transmission case, such that the package space constraints of the transmission are unaffected by the addition of the pressure sensor. Such a pressure sensor is preferably between 0.020 mm and 1 mm in size and is exposed to any suitable portion of a hydraulic control device, hydraulic line, or associated clutch volume chamber wherein hydraulic pressure is substantially equivalent to the pressure in the clutch volume chamber 324. By monitoring the pressure of fluid within the circuit connected to the clutch, a closed-loop feedback control command can be determined and used to control a hydraulic control device, such as the variable bleeding solenoid or the variable force solenoid described above, providing the pressurized fluid to the hydraulic circuit. By controlling pressure within the circuit feeding the hydraulic fluid to the clutch based upon a monitored pressure within the circuit, the operation of the associated clutch can be more accurately controlled. More accurate control of the clutch minimizes flares, tie-ups, and allows for faster shifts by reducing a need for adding time for uncertainty caused by open-loop control of the clutch.

Figure 3:
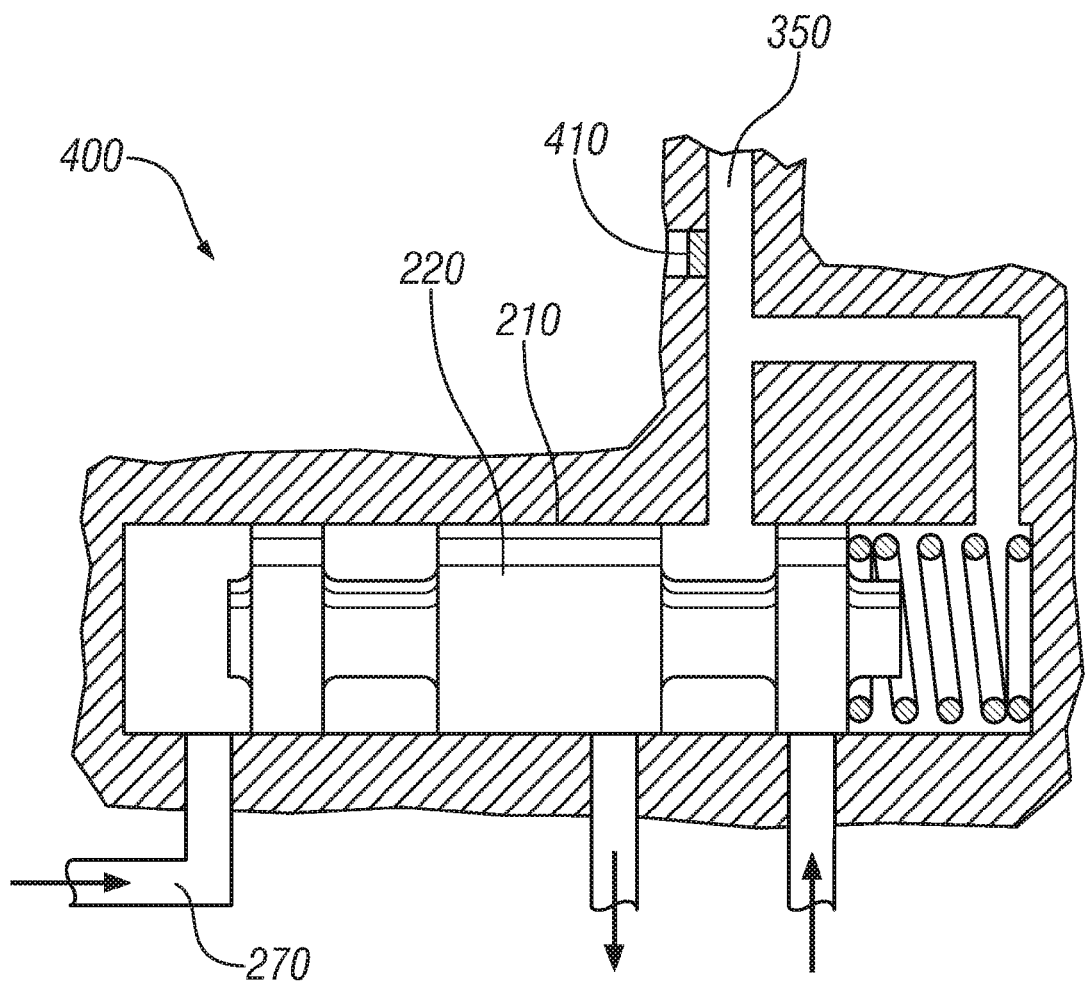
FIG. 3 schematically illustrates an exemplary clutch control circuit including a miniaturized pressure sensor monitoring pressure in a circuit supplying pressurized fluid to a clutch, in accordance with the present disclosure.

FIG. 3 schematically illustrates an exemplary clutch control circuit including a miniaturized pressure sensor monitoring pressure in a circuit supplying pressurized fluid to a clutch, in accordance with the present disclosure. Exemplary clutch control circuit 400 includes several features described in relation to circuit 200 of FIG. 1, including regulation valve 210, hydraulic line 270, and spool valve plunger 220. Additionally, hydraulic line 350 providing pressurized hydraulic fluid to a clutch, as depicted in FIG. 2, as also depicted in FIG. 3. Miniaturized pressure sensor 410 is shown in fluid communication with hydraulic line 350, monitoring the pressure of the fluid therein. Sensor 410 is depicted within a wall of hydraulic line 350 located between a hydraulic control device, in this case, regulation valve 210, and the device or clutch being controlled by the pressurized fluid. However, it will be appreciated that sensor 410 can be located anywhere in the system that the pressure to or in the clutch device can be accurately monitored. For example, sensor 410 can be located in a wall of the clutch or of the hydraulic control device instead of in hydraulic line 350. It is noted that pressure switch 240 depicted in FIG. 1 can be eliminated since a pressure transducer such as sensor 410 is capable to perform the same function an addition to the functions served by sensor 410 that switch 240 cannot serve. The position of sensor 410 is exemplary, as the sensor is small enough to exist anywhere within the overall structure of the device or system being monitored whereat the desired pressure can be measured. Exemplary sensor 410 as depicted within the wall of the hydraulic line 270 such that package constraints for the hydraulic line 270 should not be impacted by the addition of the sensor 410. In another embodiment, sensor 410 can be located in hydraulic line 270, monitoring the command pressure so that the pressure to or in the clutch device can be accurately estimated or modeled. Further it will be appreciated that sensor 410 can include any pressure sensor or transducer configuration known in the art.

It will be appreciated that accurate feedback control of the clutch requires an accurate estimation of the pressure resulting within the clutch volume chamber of the clutch. If sensor 410 is located distant from the clutch, a pressure drop, a delay, or other factors resulting from the length of hydraulic line 350 between sensor 410 and the clutch may need to be determined. However, testing has shown in some embodiments that the location of the sensor has a negligible effect upon the accuracy of the feedback control based upon the sensor output. A pressure sensor or transducer can be utilized in a number of exemplary locations within the hydraulic circuit in accordance with the present disclosure. Exemplary locations include but are not limited to within the hydraulic control device, in the hydraulic line proximate to the hydraulic control device, within the hydraulic line distant from both the hydraulic control device and the clutch volume chamber, in the hydraulic line proximate to the clutch piston, and within the clutch volume chamber.

Figure 4:
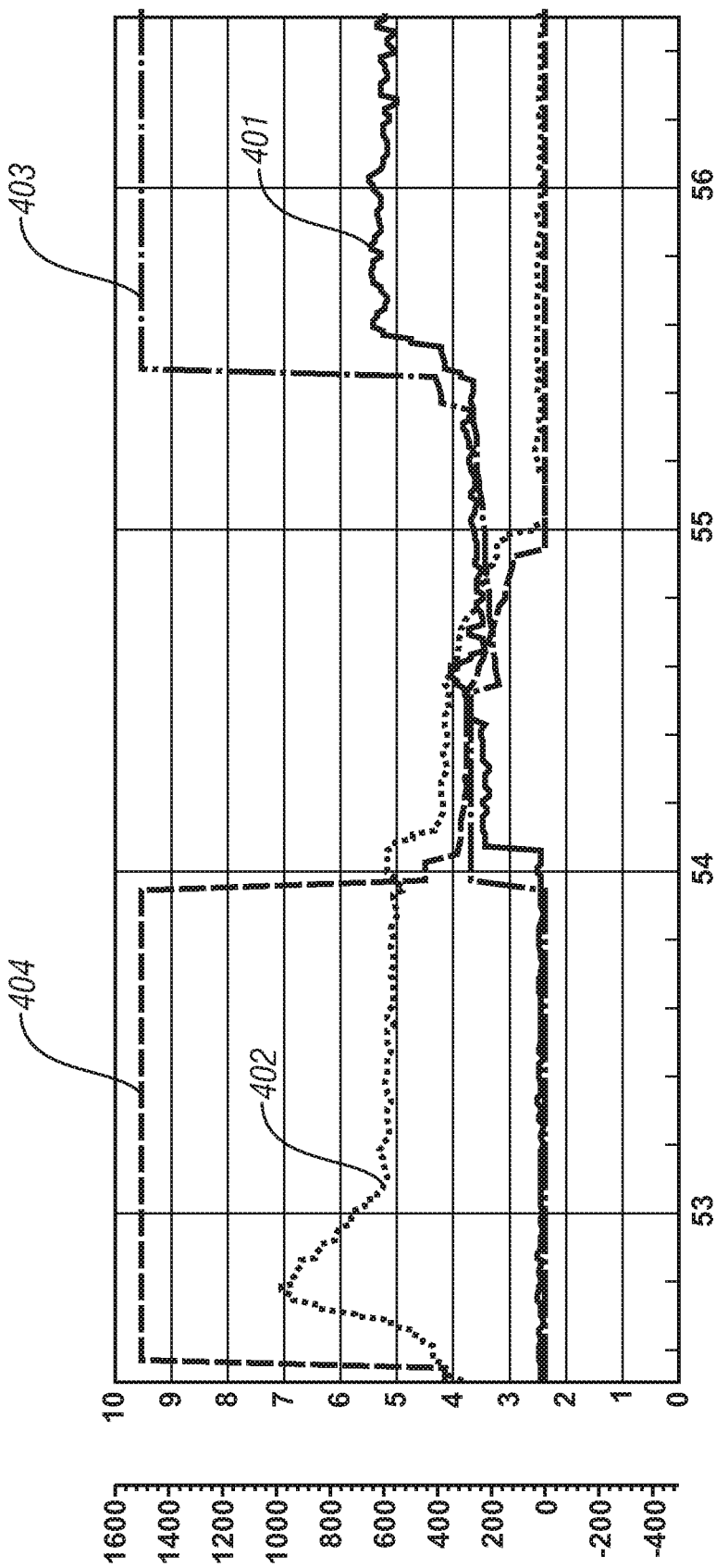
FIG. 4 depicts an exemplary system operating without a method of feedback control described herein, in accordance with the present disclosure.

FIG. 4 depicts an exemplary system operating without a method of feedback control described herein, in accordance with the present disclosure. The horizontal x-axis illustrates time in seconds. The vertical y-axis illustrates pressure in kPa. Plot 404 illustrates a pressure that an associated hydraulic control device is commanded to deliver for an off-going clutch or a clutch that is initially in a locked state. Plot 402 illustrates a measured pressure for the off-going clutch. Plot 403 illustrates a pressure that an associated hydraulic control device is commanded to deliver for an on-coming clutch or a clutch that is initially in an unlocked state. Plot 401 illustrates a measured pressure for the on-coming clutch. Examining plot 404, a large value is initially commanded resulting in an application of unreduced, full line pressure to the clutch or a maximum clamping pressure. A resulting measured pressure in the clutch in plot 402 is depicted during the same time. Just before 54 seconds, a command is initiated to purge or exhaust the clutch corresponding to an event such as a gear shift. As a result, plot 404 drops to some calibrated value below the measured pressure. Utilizing the open-loop controls described above, the system adjusts, and after a time delay, the measured pressure reduces. However, it will be noted that the measured pressure of the off-going clutch in plot 402 does not track plot 404 well. Such inaccuracy can be caused by the open-loop calibration-dependent operation of the control as described above. Similarly, examining plot 403, a null value is initially commanded resulting in an approximate measured pressure in plot 401 of zero. At approximately the same time that plot 404 depicts the initiation of the purging event, plot 403 depicts initiation of a clutch fill event, wherein the hydraulic control device is commanded to increase pressure to the clutch. In some embodiments, wherein an empty clutch volume chamber be filled by some amount before any clamping pressure is applied to the clutch, a calibrated fill period is utilized wherein some relatively high pressure or the full line pressure is applied to rapidly fill the clutch volume chamber. After the fill period, pressure can be increased according to a calibrated profile until the clutch can be estimated to be fully locked, after which, the commanded pressure can increase to some high or maximum value generating maximum clamping force. Plot 403 depicts such exemplary pressure command operations, wherein the hydraulic control device is commanded through a series of calibrated values to transition the clutch from the unlocked to the locked state. Plot 401 depicts resulting measured pressures as a result of the transitions commanded by plot 403. Similar to the comparison of plots 4 and 2 above, plot 401 includes a time lag and inaccurately tracks plot 403. Additionally, at approximately 54.6 seconds, the measured pressure continues to rise past a point whereat the commanded pressure is reduced.

The data illustrated in FIG. 4 depict an exemplary condition wherein a tie-up between the off-going and on-coming clutches is possible. Plot 402 lags and poorly tracks plot 404 in the off-going clutch, resulting in the off-going clutch disengaging at a slower rate than commanded, and plot 401 shows an elevated measured pressure in the on-coming clutch despite a reduced commanded pressure in plot 403. As a result, at approximately 54.6 seconds, both clutches have significantly higher measured pressures than commanded by the profiles of plots 404 and 403. Such increased pressures can result in one or both of the clutches being engaged when it is intended to be disengaged according to the calibrated profile of commanded pressures. While shifts and associated clutch transitions can be commanded by the depicted system, including the lag and inaccuracy of the depicted parameters, such operation requires accurate estimation of the lags, inaccuracies, and the factors affecting both.

Figure 5:
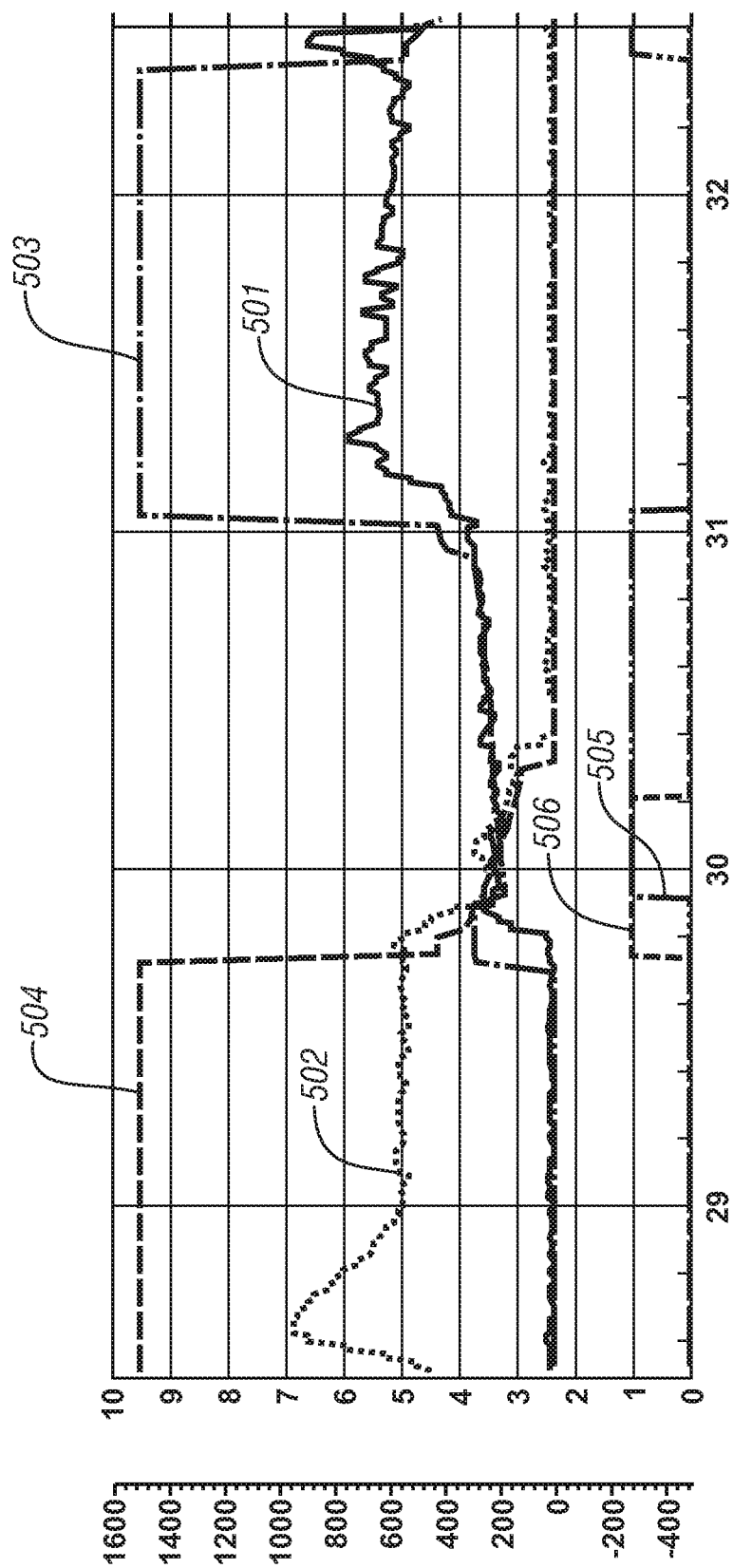
FIG. 5 depicts an exemplary system operating with an exemplary method of feedback control described herein, in accordance with the present disclosure.

FIG. 5 depicts an exemplary system operating with an exemplary method of feedback control as described herein, in accordance with the present disclosure. The horizontal x-axis illustrates time in seconds. The vertical y-axis illustrates pressure in kPa. Plots 501-504 of FIG. 5 illustrate similar parameters to plots 401-404 of FIG. 4. Plot 504 illustrates a pressure that an associated hydraulic control device is commanded to deliver for an off-going clutch or a clutch that is initially in a locked state utilizing feedback from a sensor 410, as described herein. Plot 502 illustrates a measured pressure for the off-going clutch. Plot 503 illustrates a pressure that an associated hydraulic control device is commanded to deliver for an on-coming clutch or a clutch that is initially in an unlocked state utilizing feedback from a second sensor 410, as described herein. Plot 501 illustrates a measured pressure for the on-coming clutch. Examination of plots 504 and 502 and plots 503 and 501 reveal that the measured pressures 502 and 501 more closely track their respective commanded values than the plots of FIG. 4.

Plot 506 depicts operation of a feedback control method of the hydraulic control device associated with the off-going clutch. Plot 506 depicts an exemplary scheme whereby the feedback control of pressure to the off-going clutch operates to control the off-going clutch command, describing binary on or off operation of the feedback control. In one embodiment, feedback control of the pressure to the off-going clutch can begin immediately when the purge or exhaust event is initiated and can be maintained throughout the clutch transition. In another embodiment, as depicted in FIG. 5, feedback control can begin immediately when the purge event is initiated and control the pressure though some brief period including a portion of an overall clutch transition period, unloading the associated clutch according to a desired profile, until the clutch pressure is reduced significantly. After this brief period, the feedback control can be ended, and the control can include an open-loop or maximum discharge command to quickly bring the clutch pressure to zero.

Plot 505 depicts operation of a feedback control method of the hydraulic control device associated with the on-coming clutch. In one embodiment, feedback control of the pressure to the on-coming clutch can begin immediately when the fill event is initiated. In another embodiment, a fill period utilizing an open-loop or maximum command can be utilized to quickly fill an empty clutch volume chamber of an on-coming clutch. As depicted in FIG. 5, the feedback control of the pressure to the on-coming clutch can be delayed and initiated after the fill event has taken place for some determined or calibrated period after the fill period described above. In another embodiment, the monitored pressure sensor can be utilized to determine then the fill event has reached a sufficient threshold to end the fill event or that a threshold fill event has occurred and initiate feedback control of the oncoming clutch. By utilizing feedback control of both the off-going clutch and the on-coming clutch, enabled by location of a sensor 410 in each clutch device or associated hydraulic devices, the transition of clutch states and the associated gear states can be coordinated.

As illustrated by FIG. 5 and the interaction of the various plots, control of an off-going clutch and an on-coming clutch can be coordinated to allow for a smooth transition between the gear states. Such coordination, including the feedback responses, can be accomplished according to a number of command profiles. The profiles utilized to control both clutches can include calibrated responses, with both clutches beginning their calibrated profiles from a common start time. In another example, measurements from one of the miniaturized sensors can be utilized in the control of the pressure in the other hydraulic circuit. For example, the control of the off-going clutch can be based upon the pressure within the on-coming clutch. Such control can include comparing the pressure within the other clutch to a threshold pressure or including a functional response based upon the measured pressure within the other clutch. In this way, the transition of clutch states and the associated gear states can be executed in a way to avoid unintentional operation of the associated transmission.

The above methods describe a miniaturized pressure sensor or transducer located to monitor a pressure within a hydraulic circuit. FIG. 3 depicts such a sensor located substantially within a cavity of a wall of the hydraulic circuit. However, it will be appreciated that that pressure transducer can be located to monitor the pressure within the hydraulic circuit according to a number of alternate configurations. For example, a sensor can be inserted to exist within a hydraulic line or some physical recess within the circuit, not be physically within the wall as depicted in FIG. 3, and still be consistent with the methods described herein. Such a configuration would permit the methods described herein while not interfering with the package constraints of the various components within the transmission. The miniaturized pressure sensor can be located in a number of different locations within the circuit delivering pressurized fluid to the hydraulically actuated clutch, including within the hydraulic control device, within a hydraulic line proximate to the hydraulic control device, within a hydraulic line distant from the hydraulic control device and a clutch volume chamber of the hydraulically actuated clutch, in a hydraulic line proximate to a clutch volume chamber of the hydraulically actuated clutch, or within a clutch volume chamber of the hydraulically actuated clutch. Additionally, as described above, the sensor can be placed in the command pressure hydraulic line controlling the hydraulic control device. The physical configurations of the sensor within the hydraulic circuit depicted and described are exemplary embodiments of the disclosed methods, but the disclosure is not intended to be limited to the particular examples provided herein.

The above methods describe utilizing a feedback control, for example, a PID control, monitoring a signal from a miniaturized sensor to control a hydraulically actuated clutch device. However, such a method need not be utilized in isolation. For example, the feedback control can be coupled with a feed forward control to accomplish improved control of the clutch device. Feed forward control methods monitor a number of parameters or inputs describing operation of a system and determine as an output a predicted desired control of the system being controlled. Outputs of the feed forward model can be developed experimentally, empirically, predictively, through modeling or other techniques adequate to accurately predict transmission operation, and a multitude of calibration curves might be used for the same transmission for different powertrain settings, conditions, or operating ranges.

The above methods can be operated within a control module. A control module can be embodied within a unitary device, performing the methods described herein. In other embodiments, the control module is located within or as a part of a larger control module, for example, within a transmission control module. In other embodiments, the control module can describe functions performed within a plurality of physical devices and operated to operate the methods as described.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control a plurality of hydraulically actuated clutches in a transmission, the method comprising:
    monitoring a pressure within a first hydraulic circuit providing pressurized fluid to a first hydraulically actuated clutch with a first pressure sensor that is integrated substantially within a wall defining the first hydraulic circuit;
    providing a first closed-loop feedback control command for a first hydraulic control device providing the pressurized fluid to the first hydraulic circuit based upon the monitored pressure;
    controlling the first hydraulic control device based upon the first closed-loop feedback control command;
    monitoring a second pressure within a second hydraulic circuit providing the pressurized fluid to a second hydraulically actuated clutch with a second pressure sensor that is integrated substantially within a wall defining the second hydraulic circuit;
    providing a second closed-loop feedback control command for a second hydraulic control device providing the pressurized fluid to the second hydraulic circuit based upon the monitored second pressure; and
    controlling the second control device based upon the second closed-loop feedback control command;
    wherein controlling the second control device is further based upon the monitored pressure within the first hydraulic circuit.

2. The method of claim 1, wherein the first pressure sensor comprises a micro-electromechanical pressure sensor.

3. The method of claim 1, wherein the wall defining the first hydraulic circuit comprises a wall within the first hydraulic control device.

4. The method of claim 1, wherein the wall defining the first hydraulic circuit comprises a wall proximate the hydraulic control device.

5. The method of claim 1, wherein the wall defining the first hydraulic circuit comprises a wall defining a clutch control volume of the first hydraulically actuated clutch.

6. The method of claim 1, wherein the wall defining the first hydraulic circuit comprises a wall defining a hydraulic line proximate to a piston of the first hydraulically actuated clutch.

7. The method of claim 1, wherein controlling the first hydraulic control device transitions the first clutch from a locked state to an unlocked state.

8. The method of claim 7, wherein controlling the first hydraulic control device based upon the first closed-loop feedback control command terminates prior to an overall clutch transition period.

9. The method of claim 1, wherein controlling the first hydraulic control device transitions the first clutch from an unlocked locked state to a locked state.

10. The method of claim 9, wherein controlling the first hydraulic control device based upon the first closed-loop feedback control command begins subsequent to initiation of a clutch fill event.

11. The method of claim 1, wherein the second pressure sensor comprises a second micro-electromechanical pressure sensor.

\* \* \* \* \*